3,210,208
PROCESS OF COATING ORGANOPOLY-
SILOXANE PARTICLES
George M. Grass, Jr., Phoenixville, and Donald R. Mac-
Donnell, Radnor, Pa., assignors to Smith Kline &
French Laboratories, Philadelphia, Pa., a corporation
of Pennsylvania
No Drawing. Filed May 1, 1962, Ser. No. 191,435
5 Claims. (Cl. 106—148)

This invention relates to a novel powdered form of silicone and to a rapid and inexpensive process for preparing this powdered silicone.

Silicones, in particular organopolysiloxanes, have a wide variety of uses. For example, these compounds are used as releasing agents for mold releases or in the baking industry to give a quick and clean release from baking pans. The compounds are used in cosmetics, hand creams and sun tan lotions. Other industries such as chemical processing, petroleum, food processing and textile use silicone as an antifoaming agent. More recently therapeutic uses have been revealed for the organopolysiloxanes. In veterinary practice these compounds are used for treating frothy bloat in ruminants and tympanic colic in horses. In humans the organopolysiloxanes are being used to treat gastrointestinal disturbances.

Prior to this invention the silicones were supplied either as an oil or an emulsion. More recently solid forms of silicones have been prepared by adsorbing them on silica gels or other adsorbing agents. However, none of these presently available forms of silicone are adaptable for the proper dispersion which is necessary to obtain the full effect of the silicone. Not only are the previously available forms of silicone very poorly dispersed in aqueous systems but they are also very difficult to measure and handle. For example, the silicone being in an oily semisolid or viscous liquid form is very difficult to weigh in small amounts or to mix accurately with dry ingredients.

The powdered silicone compositions of this invention overcome the previous problems such as dispersion and handling of the silicone. The applicants by preparing powder form compositions have made the compounds much more adaptable to specific situations. For example, in veterinary practice silicones are given to the animals for the treatment of bloat either by injection into the rumen or if given orally must be given as a drench. The novel powdered silicone prepared by this invention needs only to be mixed with the feed of the animal curatively or prophylactically and is ingested without any difficulty. Other advantages of the powdered silicone when applied to the heretofore mentioned uses are obvious. Oily lotions and hand creams containing liquid silicones can be replaced by dry medicated silicone powders, molds need only be dusted with the powdered silicone and foaming processes only need to be simply sprinkled with a dry antifoam powder which can be easily handled by the use of a puffet package.

In accordance with the process of the present invention an emulsion comprising the organopolysiloxanes, a non-toxic coating material and water is prepared. The emulsion is then spray dryed to form dry particles comprising the organopolysiloxane substantially completely coated with the coating material.

The oroganopolysiloxane will be in liquid form and will be present from about 5% to about 85% and preferably from about 20% to about 50% by weight of the total solids comprising the finished products. Advantageously the oily or semisolid organopolysiloxanes are represented by the general foromula:

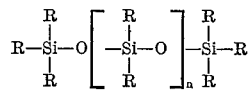

where R represents a lower alkyl group not exceeding 5 carbon atoms or an organic radical such as phenyl and n can be from 0 to 2000. Most advantageously the siloxanes will be methylpolysiloxanes of at least 200 cs. viscosity at 25° C., preferably with a viscosity of between 250 and 1000 cs. at 25° C. Preferably the methylsiloxanes will contain from 1.9 to 2.1 methyl radicals per silicone atom.

The coating material will be present from about 15% to about 95% and preferably from about 50% to about 80% by weight of the total solids comprising the finished product. The coating material will be a cellulose ester, a natural gum, a gum constituent of a natural gum, a water soluble polymer such as polyvinyl alcohol or polyvinylpyrrolidone or a proteinaceous material such as powdered egg whites, casein, milk solids, gelatin and zein or any mixture thereof. The term natural gum as used herein in the description and claims is intended to include natural gums as such and gum constituents thereof. Exemplary of cellulose esters are a lower alkyl cellulose, such as, for example, methyl or ethyl cellulose; carboxy lower alkyl cellulose, such as, for example, carboxymethylcellulose, a hydroxy lower alkyl cellulose, such as, for exampe, hydroxymethylcellulose or hydroxyethylcellulose; cellulose esters formed with organic acids, such as, for example, ammonium cellulose acetate phthalate, cellulose acetate butyrate, cellulose acetate sodium phthalate and cellulose acetate potassium phthalate; and an alkali metal salt of a cellulose ester formed with an inorganic acid, such as, for example, sodium cellulose sulfate and potassium cellulose sulfate.

Exemplary of natural gums and gum constituents thereof are acacia, tragacanth, guar gum, karaya, sodium alginate, agar, chondrus, arabic acid, bassorin, carrageenin and pectin.

Preferably, the above noted coating materials will also act as emulsifying agents. However, if the specific coating material does not possess inherent emulsifying properties it can be mixed with other emulsifying coating materials or with well known emulsifying agents such as sorbitan fatty acid esters and polyoxyethylene sorbitan fatty acid esters.

The spray drying is carried out in an apparatus which is conventionally used for spray drying and is well known to the art. The spray drying conditions may vary within wide ranges. It is, however, preferred to use a minimum inlet temperature of about 100° C. and a maximum outlet temperature of about 150° C. Correspondingly the inlet temperature will be higher than the outet temperature and advantageously will be as high as the limitations will permit. Desirably during the course of operation the inlet and outlet temperatures remain substantially constant. The dried silicone is collected in a receiver at the bottom of the main chamber.

The dry organopolysiloxane compositions of the thus outlined process are comprised of substantially spherical dry powders of uniform particle size comprising the organopolysiloxane substantially completely coated with one of the above mentioned coating materials. The particle size of the organopolysiloxane powder is from about 5 to about 1000 microns and preferably from about 20 to about 100 microns. The organopolysiloxane in the finished powder is from about 5% to about 85% and preferably from about 20% to about 50% by weight of the finished solids.

The finished organopolysiloxane powder formed from the above invention can now be evenly dispersed and conveniently handled for its many applications.

The invention will be further clarified by the following specific examples.

Example 1

| Ingredients: | Amounts, gms. |
|---|---|
| Methylcellulose, U.S.P., 15 cps. | 5 |
| Milk solids, nonfat dry | 45 |
| Dimethylpolysiloxane | 50 |
| Purified water, U.S.P. | 180 |

The methylcellulose is dispersed in the dimethylpolysiloxane. The milk solids are dissolved in water and the dispersion is added to the reconstituted milk and agitated to form an emulsion. The mixture is then homogenized to complete emulsification. This emulsion is then spray dried in a conventional spray dryer using an inlet temperature of 265° C. and an outlet temperature of at least 120° C. The product is then collected as a dry powder.

Example 2

| Ingredients: | Amounts, gms. |
|---|---|
| Methylcellulose, U.S.P., 15 cps. | 5 |
| Milk solids, nonfat dry | 20 |
| Dimethylpolysiloxane | 75 |
| Purified water, U.S.P. | 150 |

The methylcellulose is dispersed in the dimethylpolysiloxane. The milk solids are dissolved in water and the dispersion is added to the reconstituted milk and agitated to form an emulsion. The mixture is then homogenized to complete emulsification. This emulsion is then spray dried in a conventional spray dryer using an inlet temperature of 265° C. and an outlet temperature of at least 120° C. The product is then collected as a dry powder.

Example 3

| Ingredients: | Amounts, gms. |
|---|---|
| Carboxymethylcellulose | 5 |
| Dimethylpolysiloxane | 50 |
| Calcium caseinate | 45 |
| Purified water, U.S.P. | 250 |

The carboxymethylcellulose is dispersed in the dimethylpolysiloxane and the calcium caseinate is dissolved in water and mixed with the dispersion. The mixture is then homogenized to complete emulsification. This emulsion is then spray dried in a conventional spray dryer using an inlet temperature of 265° C. and an outlet temperature of at least 120° C. The product is then collected as a dry powder.

Example 4

| Ingredients: | Amounts, gms. |
|---|---|
| Polyvinyl alcohol | 15 |
| Dimethylpolysiloxane | 85 |
| Purified water, U.S.P. | 250 |

The polyvinyl alcohol is dissolved in water with the aid of heat and the dimethylpolysiloxane is added. This mixture is then homogenized to complete emulsification. This emulsion is then spray dried in a conventional spray dryer using an inlet temperature of 265° C. and an outlet temperature of at least 120° C. The product is then collected as a dry powder.

Example 5

| Ingredients: | Amounts, gms. |
|---|---|
| Methylcellulose, U.S.P., 15 cps. | 5 |
| Polyvinylpyrrolidone | 45 |
| Dimethylpolysiloxane | 50 |
| Purified water, U.S.P. | 150 |

The methylcellulose is dispersed in the dimethylpolysiloxane and the polyvinylpyrrolidone is dissolved in water and mixed with the dispersion. The mixture is then homogenized to complete emulsification. This emulsion is then spray dried in a conventional spray dryer using an inlet temperature of 265° C. and an outlet temperature of at least 120° C. The product is then collected as a dry powder.

Example 6

| Ingredients: | Amounts, gms. |
|---|---|
| Polyvinyl alcohol | 5 |
| Dimethylpolysiloxane | 40 |
| Soy bean meal | 55 |
| Purified water, U.S.P. | 450 |

The polyvinyl alcohol is dissolved in water with the aid of heat and dimethylpolysiloxane is added to this and emulsified. The soy bean meal is added and cooked until the meal becomes hydrated and a smooth suspension results. This suspension is then homogenized to complete emulsification. This emulsion is then spray dried in a conventional spray dryer using an inlet temperature of 265° C. and an outlet temperature of at least 120° C. The product is then collected as a dry powder.

Example 7

| Ingredients: | Amounts, gms. |
|---|---|
| Methylcellulose, U.S.P., 15 cps. | 5 |
| Milk solids, nonfat dry | 45 |
| Phenylmethylpolysiloxane | 50 |
| Purified water, U.S.P. | 180 |

The methylcellulose is dispersed in the phenylmethylpolysiloxane. The milk solids are dissolved in water and the dispersion is added to the reconstituted milk and agitated to form emulsification. The mixture is then homogenized to complete emulsification. This emulsion is then spray dried in the conventional spray dryer using an inlet temperature of 265° C. and an outlet temperature of at least 120° C. The product is then collected as a dry powder.

Example 8

| Ingredients: | Amounts, gms. |
|---|---|
| Acacia | 40 |
| Sorbitan monolaurate | 2 |
| Polyoxyethylene sorbitan monolaurate | 8 |
| Dimethylpolysiloxane | 50 |
| Purified water, U.S.P. | 400 |

The sorbitan monolaurate and polyoxyethylene sorbitan monolaurate are mixed with the dimethylpolysiloxane. The acacia is dissolved in the water and added to the oil phase. The mixture is then homogenized and spray dried.

What is claimed is:

1. The method of making powdered organopolysiloxane compositions of uniform particle size which comprises spray drying an aqueous oil emulsion comprising water, a liquid organopolysiloxane having the structural formula:

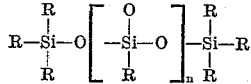

in which $n$ is an integer of from about 0 to about 2000 and in which R is a member selected from the group consisting of lower alkyl and phenyl and of from about 15% to about 95% of a coating material selected from the group consisting of acacia, guar gum, calcium caseinate, sodium caseinate, ammonium caseinate, milk solids, polyvinyl alcohol, polyvinylpyrrolidone, methylcellulose and carboxymethylcellulose, said spray drying forming dry spherical particles of the organopolysiloxane being substantially coated by said coating material.

2. The method of claim 1 characterized in that the organopolysiloxane is a dimethylpolysiloxane.

3. The method of claim 1 characterized in that the coating material is milk solids.

4. The method of claim 1 characterized in that the coating material is polyvinyl alcohol.

5. The method of claim 1 characterized in that the coating material is calcium caseinate.

References Cited by the Examiner

UNITED STATES PATENTS

| | | | |
|---|---|---|---|
| 2,843,582 | 7/58 | Voris | 106—170 |
| 2,985,544 | 5/61 | Monterey | 117—143 |
| 3,063,873 | 11/62 | Saroyan | 106—170 |
| 3,136,696 | 6/64 | Harrison | 106—287 |

FOREIGN PATENTS 878,969   10/61   Great Britain.

ALEXANDER H. BRODMERKEL, *Primary Examiner.*

MORRIS LIEBMAN, *Examiner.*